June 21, 1932. H. C. MacDOUGALL 1,864,454
AMBULANCE BED REST
Filed June 14, 1929 3 Sheets-Sheet 1

HOWARD C. MacDOUGALL, INVENTOR.
BY Victor J. Evans, ATTORNEY.

WITNESS:

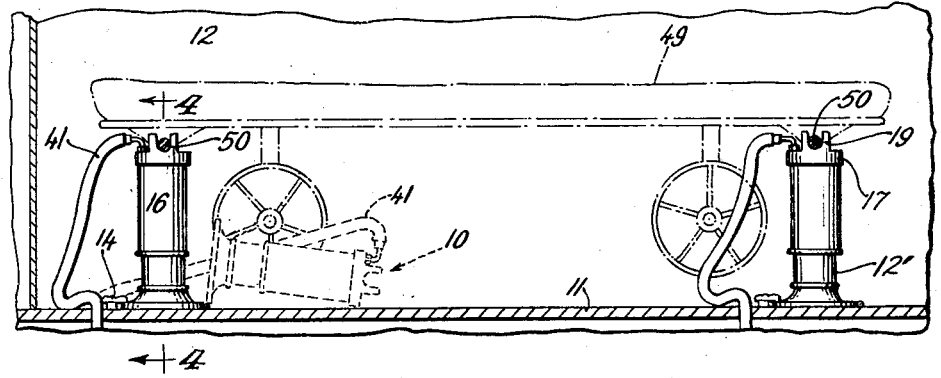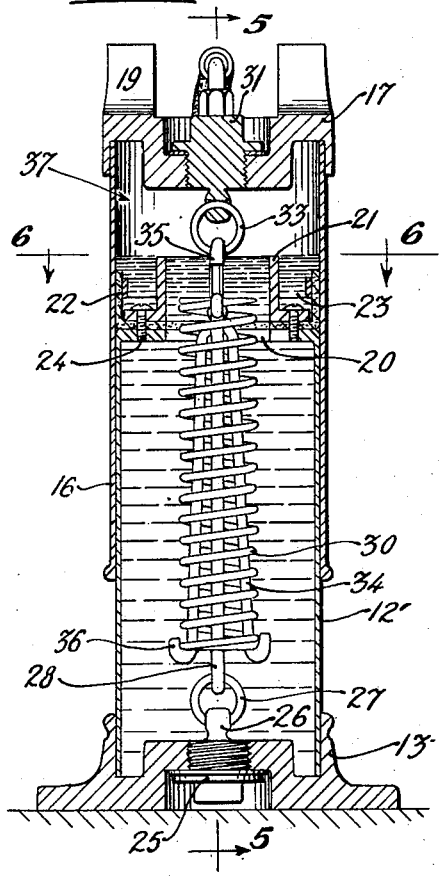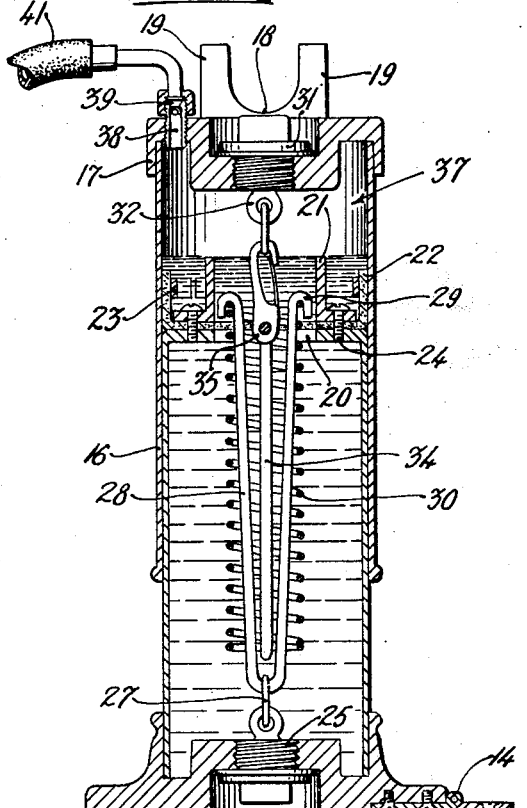

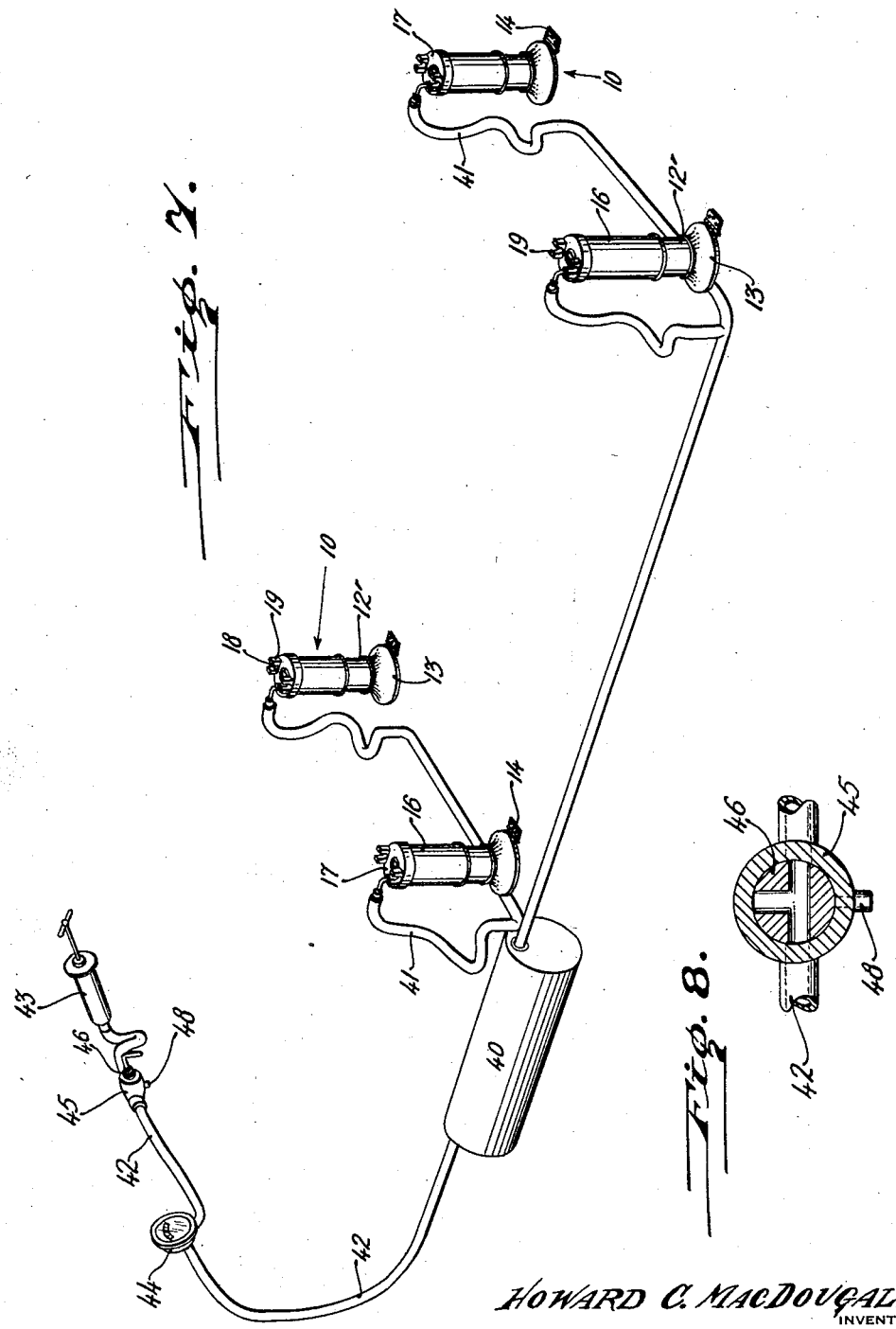

Patented June 21, 1932

1,864,454

UNITED STATES PATENT OFFICE

HOWARD C. MacDOUGALL, OF NEW YORK, N. Y.

AMBULANCE BED REST

Application filed June 14, 1929. Serial No. 370,972.

This invention relates to improvements in ambulance bed rests.

The primary object of the invention resides in a cushioning or shock absorbing means for ambulance cots or beds, for supporting the cot or bed above the floor of an ambulance for arresting any shock which may be caused by the vehicle passing over an uneven street or road, to assure comfort of a sick or injured person lying upon the cot.

Another object of the invention is to provide pneumatic jacks upon the floor of an ambulance onto which the cot may be rolled or placed, and which jacks may be raised to support the cot with its legs or wheels above the floor, the said jacks acting as shock absorbers for arresting any uneven movement of the ambulance while in motion.

A further object of the invention is the provision of an ambulance having four pneumatic jacks mounted on the floor thereof which may be simultaneously raised by the pumping of air under pressure into an equalizing pressure tank, all of the jacks receiving their air from the common tank, and which tank is filled by a hand pump conveniently located in reach of the operator or driver of the ambulance.

A further object of the invention is to provide a hand control valve in the air line system to control the filling of the system with compressed air to raise the respective jacks, and for bleeding the system of air to allow the jacks to return to a lowered position.

With these and other objects in view, the invention resides in certain novel construction and combination and arrangement of parts, the essential features of which are hereinafter fully described, are particularly pointed out in the appended claim, and are illustrated in the accompanying drawings, in which :—

Figure 3 is an enlarged vertical sectional view on the line 3—3 of Figure 2 but showing an ambulance cot in a supported position, and illustrating in dotted lines the position of one of the pneumatic jacks in an upset position.

Figure 4 is an enlarged vertical longitudinal sectional view on the line 4—4 of Figure 3.

Figure 5 is a vertical sectional view on the line 5—5 of Figure 4.

Figure 7 is a perspective view of my invention per se.

Figure 8 is a sectional view through the air control valve.

Figure 1:
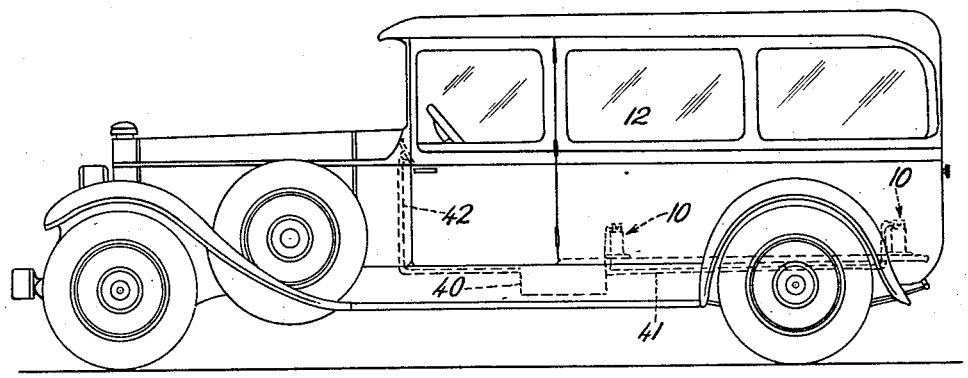
Figure 1 is a side elevation showing an automobile ambulance equipped with my invention.
Figure 2:
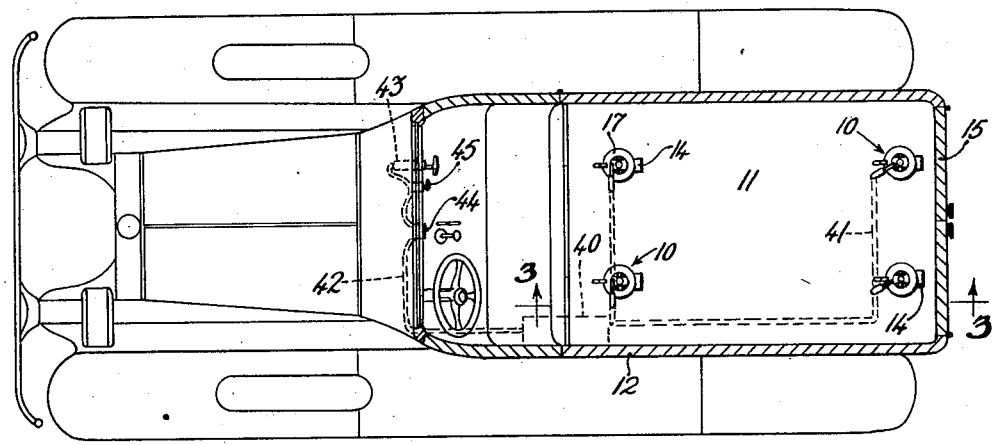
Figure 2 is a horizontal sectional view through the body of the ambulance.
Figure 6:
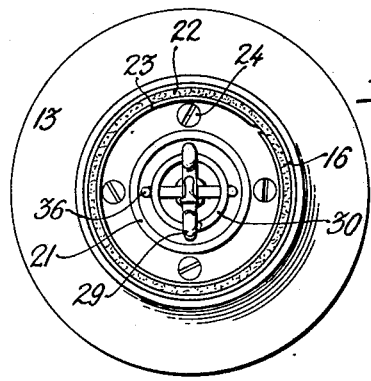
Figure 6 is a horizontal sectional view on the line 6—6 of Figure 4.

Referring to the drawings by reference characters, the numeral 10 designates one of my improved pneumatic jacks or shock absorbers, four of which are arranged in suitable spaced relation upon the floor 11 of an ambulance body 12. Each of the jacks 10 includes a stationary cylinder 12' mounted upon a base 13, the base of each jack being hingedly mounted to the floor 11 as at 14 so that each jack may swing from a vertical position to an upset position in the direction of the rear doors 15 of the body. Telescoping the stationary cylinder 12' is a movable cylinder 16, the outer end of the same being provided with a cap 17 having a seat 18 provided in spaced lugs 19 formed on said cap.

The outer end of the stationary cylinder 12' is provided with a central opening 20 and supports an upstanding collar 21 which surrounds the opening 20, while clamped between the flange and the collar 21 on the outer end of said cylinder is a leather washer 22 which is held against the inner walls of the movable cylinder 16 by flat springs 23 whereby to provide a sealed joint between the telescoping cylinders. Bolts or screws 24 pass through the flanges of the collar 21 and through the leather washer 22 and through the outer end of the stationary cylinder.

A screw plug 25 is threaded into the base 13 axially thereof and has its inner end provided with an eye 26 to which a ring 27 is connected. A substantially V-shaped member 28 is connected to the eye 27 and which member is formed of a single piece of material having its ends bent into hooks 29, which hooks provide seats for the outer end of a contractile spring 30. The cap 17 is also provided with a screw plug 31 in axial alignment with the plug 25. The inner end of said plug is provided with an eye 32 to which a ring 33 is connected. An inverted substantially V-shaped member 34 is disposed at right angles to the V-shaped member 28 and connected to the bight portion thereof is a snap hook 35 which engages a ring 33. The free ends of the inverted V-shaped member 34 are provided with hooks 36 which act as seats for the lower end of the spring 30. In this construction, it will be seen that the members 38 and 34 act as ties between the two telescoping cylinders and the contractile spring 30 acts to hold the movable cylinder 16 in retracted position with respect to the stationary cylinder 12'. The interior of the cylinders are filled with oil as shown in Figures 4 and 5 of the drawings, the level of which terminates approximately at the top of the collar 21 and above the washer 22 to positively seal the joint between the walls of the two telescoping cylinders and the space above the level of the oil within the movable cylinder 16 constitutes an air chamber 37.

Provided in the cap 17 is an air inlet and outlet 38 in which a gravity check valve 39 is mounted. From the description thus far, it will be noted that if air under pressure is introduced into the air chamber 37 to overcome the tension of the spring 30, the movable cylinder 16 will move to an extended position and that if air is bled from the air chamber, the spring 30 will tend to lower or retract the movable cylinder with respect to the stationary cylinder.

Mounted to the chassis of the ambulance or body is an air equalizing or distributing tank 40 to which the four jacks 10 are connected by flexible tubes or hose 41, the said hose leading to the air inlet and outlet ports 38 of the respective jacks. A hose or air line 42 leads from the tank 40 to a hand pump 43 which may be mounted upon the instrument board or any other suitable place within reach of the operator of the ambulance whereby air may be pumped under pressure to the tank 40 from where it is distributed simultaneously to the respective jacks through the tubes 41 in order that an equal amount of air simultaneously enters the air chambers 37 of the jacks in order to raise them at the same rate of speed. Arranged in the hose 42 is an air pressure gauge 44 which may also be mounted on the instrument board in order that the operator may know the amount of air pressure in the system. Also mounted in the air line 42 is an air control valve 45 having a manually turnable plug 46 provided with a three-way passage 47 in order that air from the pump 43 may pass directly through the air line 42 to the tank 40 or by manipulation of the plug, the line 42 may be brought into communication with a bleed outlet 48 provided in the valve in order to bleed the system of air pressure when desired to lower the jacks by releasing the air from the air chambers 37.

Assume that the jacks are in a lowered position and it is desired to raise the same to support an ambulance wheel bed 49 above the floor 11 of the ambulance body. The bed 49 with its occupant is rolled onto the floor 11 of the body until the transverse bars 50 are in alignment with the seats of the front and rear sets of the jacks. The operator then proceeds to actuate the hand pump 43, the valve 45 being in a position so that the air from the pump passes through the air line 42 to the tank 40 from where it is distributed through the flexible hose 41 to the air chambers 37 of the respective jacks. Sufficient air is pumped into the system to actuate the movable cylinders 16 in order to raise the wheels of the ambulance bed above the level of the floor as shown in dotted lines in Figure 3 of the drawings. The amount of air necessary to raise the jacks with the bed supported thereon, is of course, dependent upon the weight of the occupant of the bed. It will now be seen that any vibration of the ambulance body during travel of the ambulance will be taken up by these pneumatic jacks which in turn act in the capacity of shock absorbers. In turning right or left, the tendency of one side of the ambulance bed to move downward is prevented by the check valves 39 as any increased pressure by the downward movement of the movable cylinders of certain of the jacks will operate the check valves 39 to prevent any change of air pressure in those particular jacks.

To remove the ambulance bed 49, the same may be lifted from the seats 18 and the jacks upset as shown in dotted lines in Figure 3 whereupon the wheels of the bed may be lowered onto the floor of the body and the bed rolled rearwardly. I have found it unnecessary to bleed the system after each use as the jacks may be set up in a vertical position with the air remaining therein and the ambulance bed replaced upon the seats. However, the air pressure may be reduced from the system in the event that the occupant of the bed is of a lighter weight than the occupant previously supported and for this purpose, the valve 45 may be actuated so that the three-way port 47 registers with the bleed port 48 and with the air line 42. Only a small amount of air is capable of being exhausted from the system during each actuation of the valve, therefore, the valve must be turned on or off to such position due to the fact that the check valve has a tendency to check the flow of air from the respective air chambers 37. The air pressure being equal on opposite sides of the ball of the check valve, the said ball is normally unseated due to its weight and the outward rush of air through the port 38 tends to close the valve, thus by turning on and off of the valve 45, the system may be gradually exhausted of air when required but as before stated, it is unnecessary to bleed the system during use of the jacks.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In a pneumatic jack comprising an outer hollow cylinder having a head, a second hollow cylinder having a closed base and a top annular inwardly projecting horizontal flange, said second cylinder being slidable relative to the first cylinder and there being an air chamber within the cylinders, said chamber having also therein a lubricating liquid, a yieldable washer having one flange positioned on said first flange and having a vertical flange disposed in contacting relation with the inner periphery of the outer cylinder, spring means retaining said vertical flange in position, a rigid annular flange positioned on said first yieldable flange, fastening elements maintaining said latter flange and said first flange in tight relation with said first yieldable flange, and a second vertical flange rising from said rigid flange and extending higher than the top of said first vertical flange, thereby providing a space between said second vertical flange and the inner periphery of said outer cylinder for housing part of the liquid to facilitate relative movement of the cylinders, said lubricating liquid extending above the vertical flange of said washer to seal the joint between the cylinders, said hollow cylinders having opposed closed ends, said cylinders having an air chamber therein, a ring on each of said ends in said chamber, an elongate member supported at one of its terminals on one of said rings and having a pair of hooks adjacent the other ring, another elongate member supported at one of its terminals on said latter ring and having a pair of hooks adjacent the first mentioned terminal of said first elongate member, and a helical coil spring carried on said members and having its opposed end coils in the terminal hooks of said respective members for resilinetly resisting air pressure in said chamber during reciprocation of said cylinders.

In testimony whereof I have affixed my signature.

HOWARD C. MacDOUGALL.